US008223177B2

(12) United States Patent
Nathan et al.

(10) Patent No.: US 8,223,177 B2
(45) Date of Patent: Jul. 17, 2012

(54) METHOD AND SYSTEM FOR DRIVING A PIXEL CIRCUIT IN AN ACTIVE MATRIX DISPLAY

(75) Inventors: Arokia Nathan, Waterloo (CA); Shahin Jafarabadiashtiani, Waterloo (CA); G. Reza Chaji, Waterloo (CA)

(73) Assignee: Ignis Innovation Inc., Waterloo, Ontario (CA)

( * ) Notice: Subject to any disclaimer, the term of this patent is extended or adjusted under 35 U.S.C. 154(b) by 1232 days.

(21) Appl. No.: 11/481,489

(22) Filed: Jul. 6, 2006

(65) Prior Publication Data

US 2007/0008253 A1 Jan. 11, 2007

(30) Foreign Application Priority Data

Jul. 6, 2005 (CA) ..................................... 2510855

(51) Int. Cl.
*G09G 5/10* (2006.01)
*G09G 5/00* (2006.01)
*G09G 3/30* (2006.01)
*G09G 3/32* (2006.01)
*G06F 3/038* (2006.01)

(52) U.S. Cl. ........ 345/691; 345/204; 345/214; 345/215; 345/76; 345/82

(58) Field of Classification Search .......... 345/204–206, 345/690–693, 210, 214–215, 76–78, 82–83
See application file for complete search history.

(56) References Cited

U.S. PATENT DOCUMENTS 4,354,162 A * 10/1982 Wright .......................... 330/260
5,589,847 A 12/1996 Lewis
5,670,973 A 9/1997 Bassetti et al.
5,748,160 A 5/1998 Shieh et al.
5,815,303 A 9/1998 Berlin
6,097,360 A 8/2000 Holloman
6,259,424 B1 7/2001 Kurogane
6,288,696 B1 9/2001 Holloman
6,320,325 B1 11/2001 Cok et al.
6,414,661 B1 7/2002 Shen et al.

(Continued)

FOREIGN PATENT DOCUMENTS

CA 1294034 1/1992

(Continued)

OTHER PUBLICATIONS

Arokia Nathan et al., “Amorphous Silicon Thin Film Transistor Circuit Integration for Organic LED Displays on Glass and Plastic”, IEEE Journal of Solid-State Circuits, vol. 39, No. 9, Sep. 2004, pp. 1477-1486.

(Continued)

*Primary Examiner* — Bipin Shalwala
*Assistant Examiner* — Ilana Spar
(74) *Attorney, Agent, or Firm* — Nixon Peabody LLP

(57) ABSTRACT

A method and system for driving a pixel circuit in an active matrix display is provided. The system implements a feedback driving scheme to enhance programming speed of the pixel circuit. The system includes a column driver for driving the pixel circuit with feedback. A controller controls a signal on a programming signal line during a programming cycle. For example, the driver may include a model for reducing the settling time of a pixel current. During the programming mode, an accelerating pulse may be provided to accelerate the programming of the pixel circuit.

25 Claims, 7 Drawing Sheets

U.S. PATENT DOCUMENTS

| | | | |
|---|---|---|---|
| 6,580,657 B2 | 6/2003 | Sanford et al. | |
| 6,594,606 B2 | 7/2003 | Everitt | |
| 6,618,030 B2 | 9/2003 | Kane et al. | |
| 6,687,266 B1 | 2/2004 | Ma et al. | |
| 6,690,344 B1 | 2/2004 | Takeuchi et al. | |
| 6,693,388 B2 | 2/2004 | Oomura | |
| 6,720,942 B2 | 4/2004 | Lee et al. | |
| 6,738,035 B1 | 5/2004 | Fan | |
| 6,771,028 B1 | 8/2004 | Winters | |
| 6,777,712 B2 | 8/2004 | Sanford et al. | |
| 6,806,638 B2 | 10/2004 | Lih et al. | |
| 6,809,706 B2 | 10/2004 | Shimoda | |
| 6,909,419 B2 | 6/2005 | Zavracky et al. | |
| 6,937,215 B2 * | 8/2005 | Lo | 345/82 |
| 6,943,500 B2 * | 9/2005 | LeChevalier | 315/169.3 |
| 6,995,510 B2 | 2/2006 | Murakami et al. | |
| 6,995,519 B2 * | 2/2006 | Arnold et al. | 315/169.3 |
| 7,027,015 B2 | 4/2006 | Booth, Jr. et al. | |
| 7,034,793 B2 | 4/2006 | Sekiya et al. | |
| 7,106,285 B2 | 9/2006 | Naugler | |
| 7,274,363 B2 | 9/2007 | Ishizuka et al. | |
| 7,321,348 B2 | 1/2008 | Cok et al. | |
| 7,502,000 B2 | 3/2009 | Yuki et al. | |
| 7,535,449 B2 | 5/2009 | Miyazawa | |
| 7,554,512 B2 | 6/2009 | Steer | |
| 7,619,594 B2 | 11/2009 | Hu | |
| 7,619,597 B2 | 11/2009 | Nathan et al. | |
| 2002/0084463 A1 | 7/2002 | Sanford et al. | |
| 2002/0101172 A1 | 8/2002 | Bu | |
| 2002/0158823 A1 | 10/2002 | Zavracky et al. | |
| 2002/0186214 A1 | 12/2002 | Siwinski | |
| 2002/0190971 A1 * | 12/2002 | Nakamura et al. | 345/204 |
| 2002/0195967 A1 | 12/2002 | Kim et al. | |
| 2003/0020413 A1 | 1/2003 | Oomura | |
| 2003/0030603 A1 | 2/2003 | Shimoda | |
| 2003/0076048 A1 | 4/2003 | Rutherford | |
| 2003/0151569 A1 | 8/2003 | Lee et al. | |
| 2003/0179626 A1 | 9/2003 | Sanford et al. | |
| 2004/0066357 A1 | 4/2004 | Kawasaki | |
| 2004/0135749 A1 | 7/2004 | Kondakov et al. | |
| 2004/0183759 A1 | 9/2004 | Stevenson et al. | |
| 2004/0189627 A1 | 9/2004 | Shirasaki et al. | |
| 2004/0257355 A1 | 12/2004 | Naugler | |
| 2005/0110420 A1 | 5/2005 | Arnold et al. | |
| 2005/0140610 A1 | 6/2005 | Smith et al. | |
| 2005/0145891 A1 | 7/2005 | Abe | |
| 2005/0156831 A1 | 7/2005 | Yamazaki et al. | |
| 2006/0038758 A1 | 2/2006 | Routley et al. | |
| 2006/0232522 A1 * | 10/2006 | Roy et al. | 345/76 |
| 2007/0080908 A1 | 4/2007 | Nathan et al. | |
| 2007/0182671 A1 | 8/2007 | Nathan et al. | |

FOREIGN PATENT DOCUMENTS

| | | |
|---|---|---|
| CA | 2368386 | 9/1999 |
| CA | 2432530 | 7/2002 |
| CA | 2498136 | 3/2004 |
| CA | 2522396 | 11/2004 |
| CA | 2443206 | 3/2005 |
| CA | 2472671 | 12/2005 |
| CA | 2567076 | 1/2006 |
| EP | 1 194 013 | 3/2002 |
| EP | 1 335 430 A1 | 8/2003 |
| EP | 1 381 019 | 1/2004 |
| EP | 1 521 203 A2 | 4/2005 |
| JP | 10-254410 | 9/1998 |
| JP | 2002-278513 | 9/2002 |
| JP | 2003-076331 | 3/2003 |
| JP | 2003-308046 | 10/2003 |
| WO | 9948079 | 9/1999 |
| WO | 01/27910 A1 | 4/2001 |
| WO | 03/034389 | 4/2003 |
| WO | 03/063124 | 7/2003 |
| WO | 2004/003877 | 1/2004 |
| WO | 2004/034364 | 4/2004 |
| WO | 2005/022498 | 3/2005 |
| WO | WO 2005029456 A1 * | 3/2005 |
| WO | 2005/055185 | 6/2005 |
| WO | 2006/063448 | 6/2006 |

OTHER PUBLICATIONS

Joon-Chul Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.

Shahin Jafarabadiashtiani et al., "P-25: A New Driving Method for a-Si AMOLED Displays Based on Voltage Feedback", Digest of Technical Papers, SID Int. Symp., Boston, May 27, 2005, pp. 316-319.

Alexander et al.: "Pixel circuits and drive schemes for glass and elastic AMOLED displays"; dated Jul. 2005 (9 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A novel driving scheme for high-resolution large-area a-Si:H AMOLED displays"; dated Aug. 2005 (4 pages).

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "eUTDSP: a design study of a new VLIW-based DSP architecture"; dated May 2003 (4 pages).

Chaji et al.: "High Speed Low Power Adder Design With A New Logic Style: Pseudo Dynamic Logic (SDL)"; dated Oct. 2001 (4 pages).

Chaji et al.: "Low-Cost Stable a-Si:H AMOLED Display for Portable Applications"; dated Jun. 2006 (4 pages).

Chaji et al.: "Pseudo dynamic logic (SDL): a high-speed and low-power dynamic logic family"; dated 2002 (4 pages).

Chaji et al.: "Stable a-Si:H circuits based on short-term stress stability of amorphous silicon thin film transistors"; dated May 2006 (4 pages).

Lee et al.: "Ambipolar Thin-Film Transistors Fabricated by PECVD Nanocrystalline Silicon"; dated 2006 (6 pages).

Matsueda y et al.: "35.1: 2.5-in. AMOLED with Integrated 6-bit Gamma Compensated Digital Data Driver"; dated May 2004 (4 pages).

Nathan et al.: "Backplane Requirements for Active Matrix Organic Light Emitting Diode Displays"; dated 2006 (16 pages).

Nathan et al.: "Driving schemes for a-Si and LTPS AMOLED displays"; dated Dec. 2005 (11 pages).

Nathan et al.: "Invited Paper: a -Si for AMOLED—Meeting the Performance and Cost Demands of Display Applications (Cell Phone to HDTV)"; dated 2006 (4 pages).

Philipp, Hal: "Charge transfer sensing"; dated Dec. 1999 (10 pages).

Rafati et al.: "Comparison of a 17 b multiplier in Dual-rail domino and in Dual-rail D L (D L) logic styles"; dated 2002 (4 pages).

Safavaian et al.: "Three-TFT image sensor for real-time digital X-ray imaging"; dated Feb. 2, 2006 (2 pages).

Safavian et al.: "3-TFT active pixel sensor with correlated double sampling readout circuit for real-time medical x-ray imaging"; dated Jun. 2006 (4 pages).

Safavian et al.: "Self-compensated a-Si:H detector with current-mode readout circuit for digital X-ray fluoroscopy"; dated Aug. 2005 (4 pages).

Safavian et al.: "TFT active image sensor with current-mode readout circuit for digital x-ray fluoroscopy [5969D-82]"; dated Sep. 2005 (9 pages).

Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.

* cited by examiner

METHOD AND SYSTEM FOR DRIVING A PIXEL CIRCUIT IN AN ACTIVE MATRIX DISPLAY

FIELD OF INVENTION

The present invention relates to display technologies, more specifically a method and system for driving a pixel circuit in an active matrix display.

BACKGROUND OF THE INVENTION

Active-matrix organic light emitting diode (AMOLED) displays are attracting attention due to several key advantages such as high efficiency, wide viewing angle, high contrast, and low fabrication cost. Among different technologies for implementation of AMOLED pixel circuits, hydrogenated amorphous silicon (a-Si:H) thin film transistor (TFT) is gathering more attention due to well established manufacturing infrastructure and low fabrication cost. However the threshold voltage ($V_T$) of a-Si:H TFTs shifts over time with gate bias stress. If the current in the pixels depends on the $V_T$ of TFTs, $V_T$ shift causes degradation in the OLED luminance. This signifies the demand for pixel circuits and driving schemes that provide the OLED with a $V_T$-independent current. Among different driving schemes, current programming has shown reasonable stability (A. Nathan et al., "Amorphous silicon thin film transistor circuit integration for organic LED displays on glass and plastic," IEEE J. Solid-State Circuits, vol. 39, no. 9, September 2004, pp. 1477-1486). However, for small currents the programming time is large due to low field-effect mobility of a-Si:H TFTs and high parasitic capacitance of the data line. $V_T$-compensating voltage-programmed pixels have smaller programming times (J. Goh et al., "A new a-Si:H thin-film transistor pixel circuit for active-matrix organic light-emitting diodes," IEEE Electron Dev. Letts., vol. 24, no. 9, pp. 583-585, 2003) at the cost of imperfect compensation of $V_T$.

Recently, a driving scheme based on voltage feedback has been presented (S. Jafarabadiashtiani et al., "P-25: A New Driving Method for a-Si AMOLED Displays Based on Voltage Feedback," Dig. of Tech. Papers, SID Int. Symp., Boston, pp. 316-319, May 27, 2005). The method provides proven stability and faster programming than the current-programming scheme. However, it is not fast enough to fulfill the demands for high-resolution large displays.

It is therefore desirable to provide a method and system that enhance the programming speed of a light emitting device display.

SUMMARY OF THE INVENTION

It is an object of the invention to provide a method and system that obviates or mitigates at least one of the disadvantages of existing systems.

In accordance with an aspect of the present invention there is provided a system for driving a pixel circuit in an active matrix display. The system includes a driver for driving a data line connected to the pixel circuit. The driver includes a feedback mechanism for producing a data signal on the data line based on a feedback signal on a feedback line from the pixel circuit and a signal on a programming signal line, and a module for reducing the settling time of a pixel current. The system includes a controller for controlling the signal on the programming signal line during a programming cycle such that the signal on the programming signal line has a primary pulse for boosting the charging of a capacitance of the feedback line.

In accordance with an aspect of the present invention there is provided a method of driving a pixel circuit in an active matrix display. The pixel circuit is connected to a data line for receiving data from a driver and a feedback line for providing a feedback signal to the driver. The driver drives the data line based on the feedback signal and a signal on a programming signal line. The method includes the steps of: during a programming cycle, providing, to the programming signal line, a primary pulse for boosting the charging of a capacitance of the feedback line, and subsequently providing a pulse with programming data.

In accordance with a further aspect of the present invention, there is provided a a system for driving a pixel circuit in an active matrix display. The system includes a driver for driving a data line connected to the pixel circuit. The driver includes a feedback mechanism for producing a data signal on the data line based on a feedback signal on a feedback line from the pixel circuit and a signal on a programming signal line, and a lead compensator provided between the feedback mechanism and the data line.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Embodiments of the present invention are described using an AMOLED display including a plurality of pixel circuits, each having an organic light emitting diode (OLED) and a plurality of thin film transistors (TFTs). However, the pixel circuit may include any light emitting device other than OLED, and the pixel circuit may include any transistors other than TFTs. The transistors in the pixel circuit may be n-type transistors or p-type transistors. The transistors in the pixel circuit may be fabricated using amorphous silicon, nano/micro crystalline silicon, poly silicon, organic semiconductors technologies (e.g., organic TFT), NMOS/PMOS technology or CMOS technology (e.g., MOSFET). The pixel circuit may be a current-programmed pixel or a voltage-programmed pixel.

In the description, "pixel circuit" and "pixel" may be used interchangeably. In the description, "signal", "(signal) line" and "line" may be used interchangeably.

The embodiments of the present invention involve a feedback driving scheme which enhances the programming speed of pixel circuits.

Figure 1:
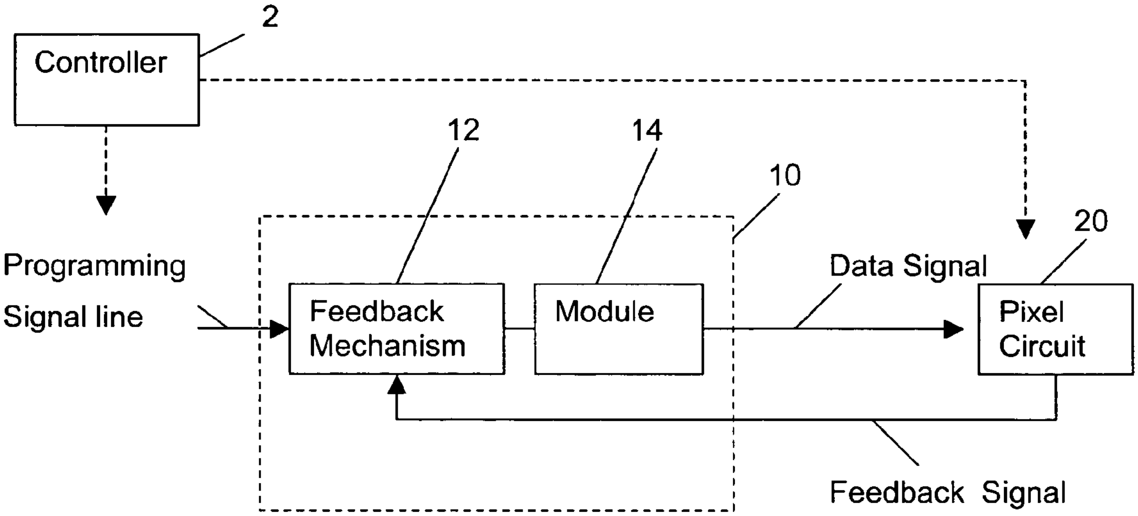
FIG. 1 illustrates a pixel system for a feedback driving scheme in accordance with an embodiment of the present invention.

FIG. 1 illustrates a pixel system for a feedback driving scheme in accordance with an embodiment of the present invention. The pixel system includes a pixel circuit 20, a driver 10 for driving the pixel circuit 20, and a controller 2 for controlling the operation of the pixel system. The driver 10 includes a feedback module 12 and a module 14 for reducing the settling time and overshot for programming signals. The driver 10 may be shared by a plurality of pixel circuits in a column. The pixel circuit 20 is selected by the controller 2. The driver 10 produces a data signal based on a signal on a programming signal line and a feedback signal from the pixel circuit 20. The feedback signal is associated with the OLED current. As described below, the programming signal has an accelerating pulse. The accelerating pulse is set so as to accelerate the programming of the pixel circuit 20. The pixel circuit 20 may, but not limited to, have a current feedback, a voltage feedback, or an optical feedback.

Figure 2:
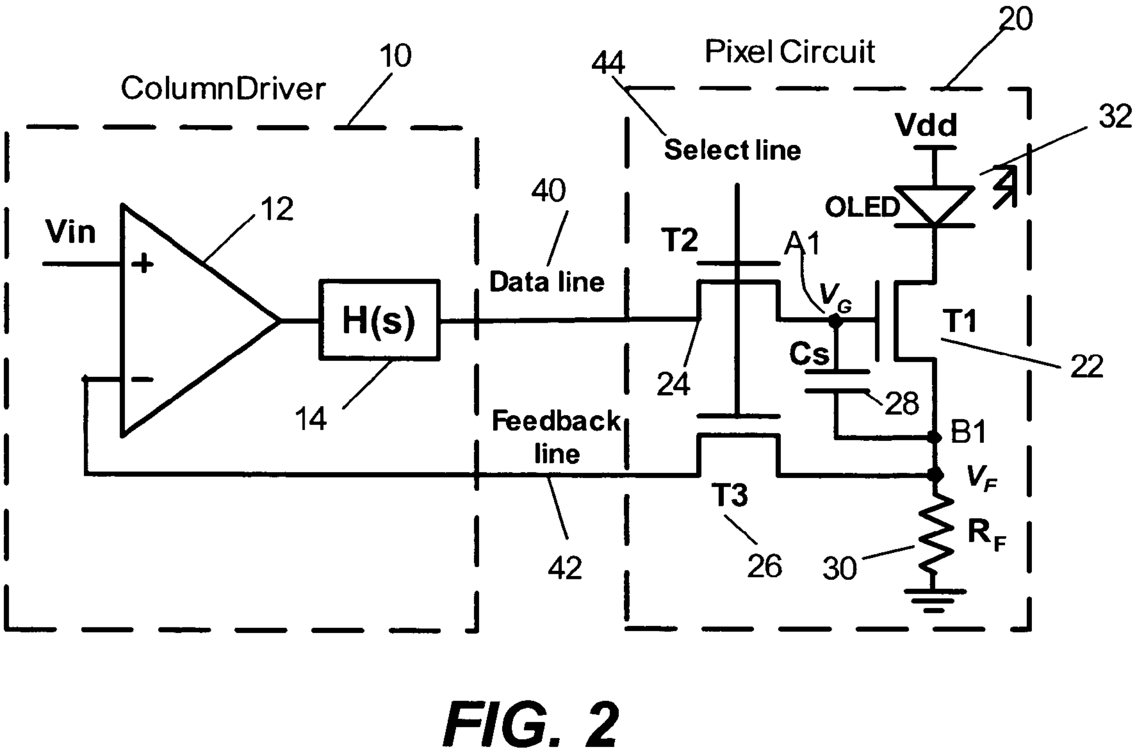
FIG. 2 illustrates an example of the pixel system.

FIG. 2 illustrates an example of the pixel system. The pixel circuit 20 of FIG. 2 includes a pixel driver having a driving TFT 22, switching TFTs 24 and 26, a storage capacitor 28 and a feedback resistor 30 for driving an OLED 32. The pixel circuit 20 is fabricated with a-Si:H TFTs. The feedback resistor 30 is fabricated with a stable n+ amorphous or microcrystalline silicon layer, which is compatible with the TFT process and is used for fabrication of TFT contacts. However, in poly silicon or organic technology, the resistor can be fabricated using poly silicon and organic semiconductor/metallic material.

The anode terminal of the OLED 32 is connected to a voltage supply Vdd and the cathode terminal of the OLED 32 is connected to the first terminal of the driving TFT 22. The first terminal of the switching TFT 24 is connected to a data line 40. The second terminal of the switching TFT 24, the gate terminal of the driving TFT 22, and the first terminal of the storage capacitor 28 are connected at node A1. The first terminal of the switching TFT 26 is connected to a feedback line 42. The second terminal of the switching TFT 26, the second terminal of the driving TFT 22, and the second terminal of the storage capacitor 28 are connected to node B1. The gate terminals of the switching TFTs 24 and 26 are connected to a select line 44. The resistor 30 is connected between node B1 and ground. The feedback line 42 transmits to the column driver 10 a feedback signal associated with the OLED current.

In FIG. 2, the feedback resistor 30 is in the pixel circuit 20. However, the feedback resistor 30 may be in the column driver 10, and thus be shared by a plurality of pixel circuits.

During the programming cycle, the pixel circuit 20 is connected to the external driving system through the data line 40 and the feedback line 42, forming a voltage-controlled current source. After the programming cycle, the gate-source voltage $V_G$ of the driving TFT 22 is saved by the storage capacitor 28 thereby allowing the pixel circuit 20 to drive the OLED 32 with the appropriate programming current.

In FIG. 2, a differential amplifier is shown as an example of the feedback module 12 of FIG. 1. In FIG. 2, a lead compensator is shown as an example of the module 14 of FIG. 1. The column driver 10 of FIG. 2 includes the differential amplifier 12 with high voltage gain in series with the lead compensator 14. The column driver 10 may be implemented in a high-voltage CMOS technology. The differential amplifier 12 may be an Op-Amp, such as a monolithic FET-input Op-Amp. The differential amplifier 12 receives the feedback signal on the feedback line 42 and a signal on a programming signal line Vin. The output of the differential amplifier 12 is provided to the lead compensator 14. The output of the lead compensator 14 is connected to the data line 40. The lead compensation reduces the settling time and overshot for larger programming signal.

The transfer function of the compensator 14 is, for example, in the form of:

$$H(s)=(1+s\tau_Z)/(1+s\tau_p) \quad (1)$$

where $\tau_p<\tau_Z$ for non-zero values of $\tau_p$ and $\tau_Z$. $\tau_p$ and $\tau_Z$ may be equal to zero.

The values of $\tau_p$ and $\tau_Z$ are designed based on, for example, the circuit parameters such as parasitic capacitance of the data and feedback, gain and unity-gain bandwidth of the differential amplifier, the mobility of the thin film transistors of the pixel circuit, or combinations thereof. The lead compensation can enhance the settling time of the current in the AMOLED pixel circuit, preferably the settling time at larger programming currents associated with higher greyscales. The lead compensation effectively reduces the settling time of the OLED current associated with medium and higher greyscale levels.

Circuit analysis and simulation results show that the smallest programming times are achieved if $\tau_Z$ satisfies:

$$1/(C_{FP}R_s3)<\tau_Z<1/(C_SR_s2) \quad (2)$$

where $C_{FP}$ is the parasitic capacitance of the feedback line 42 and Cs is the storage capacitor 28 of the pixel circuit 20. $R_s$2 and $R_s$3 are the ON resistance of the switching TFTs 24 and 26, respectively.

Figure 3:
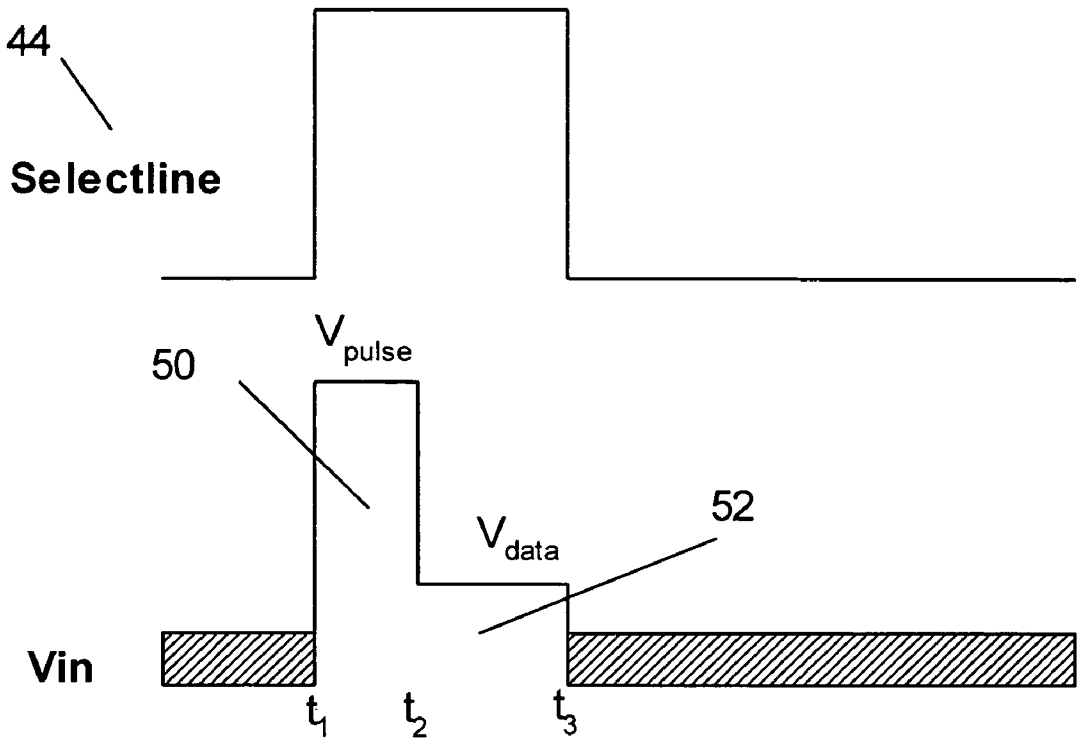
FIG. 3 illustrates an example of waveforms for driving a pixel circuit of FIG. 2.

The operation of the pixel circuit 20 of FIG. 2 is described in detail. An accelerating pulse is provided to the pixel circuit 20 to enhance the settling as shown in FIG. 3. FIG. 3 illustrates an example of waveforms for driving the pixel circuit 20 of FIG. 2. As shown in FIG. 3, the signal on the programming signal line Vin includes (1) a primary accelerating pulse 50 between t1 and t2 and (2) a pulse 52 between t2 and t3 with the desired programming voltage Vdata (t1<t2<t3). The primary accelerating pulse 50 has a value Vpulse that is larger than the desired programming voltage Vdata. The accelerating pulse 50 increases the loop gain and boosts the charging of $C_{FP}$ at the beginning of programming and results in a faster programming.

During the programming mode t1-t3, the select line 44 goes high, turning on the switching transistors 24 and 26. Consequently, the driving transistor 22, the feedback transistor 30 and the differential amplifier 12 form a voltage-controlled current source. The feedback resistor 30 converts the current of the driving transistor 22 to a voltage $V_F$. The voltage $V_F$ is then compared to Vin by the differential amplifier 12. Due to the inherent negative feedback in the circuit, the output of the column driver 10 adjusts the gate voltage of the driving transistor 22. During t1-t2, the accelerating pulse 50 increases the loop gain and boosts the charging of $C_{FP}$, resulting in a faster programming. During t2-t3, Vin goes to the desired programming level. The pixel circuit 20 compensates for the shift of the threshold voltage in the driving transistor 22, as long as the voltage $V_G$ at the gate of the driving transistor 22 does not exceed the maximum output range of the differential amplifier 12, and the voltage at the select line 44 is high enough to turn on the switching transistor 24.

After t3, the select line 44 goes low, disconnecting the pixel circuit 20 from the differential amplifier 12 by turning off the switching transistors 24 and 26. The current through the OLED 32 does not change considerably as the storage capacitor 28 stores the gate-source voltage of the driving transistor 22.

The driving signals of FIG. 3 are applied, for example, to the AMOLED display for small programming currents. For large currents, Vpulse may be equal or even smaller than Vdata. The value of Vpulse is defined, for example, based on the parameters of the pixel circuit of FIG. 2 and the value of Vdata.

Figure 4:
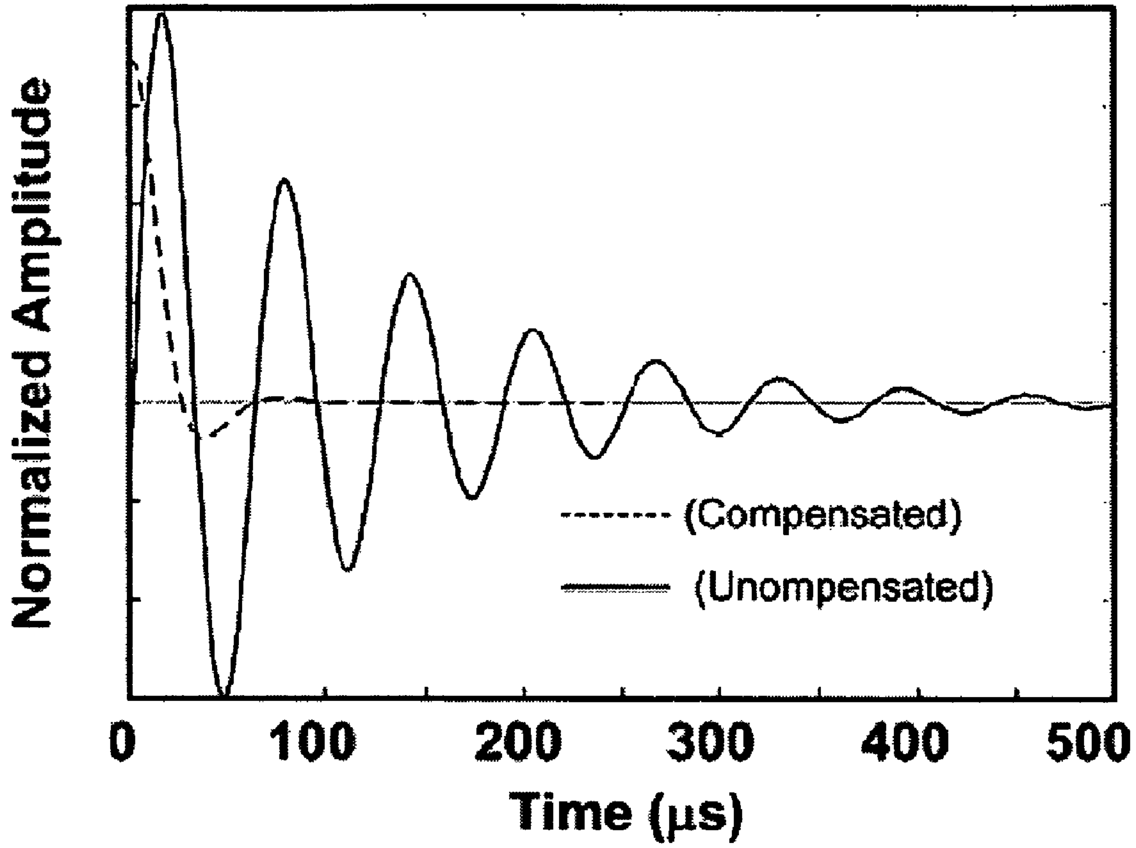
FIG. 4 illustrates a simulation result of the effect of lead compensation on the settling time of the OLED current.

FIG. 4 illustrates a simulation result of the effect of the lead compensation (e.g., 14 of FIG. 2) on the settling time of the OLED current. Since without lead compensation the system experience lots of ripples, the settling time increases dramatically. However, using the lead compensation controls the ripples and thus improves the settling time.

Figure 5:
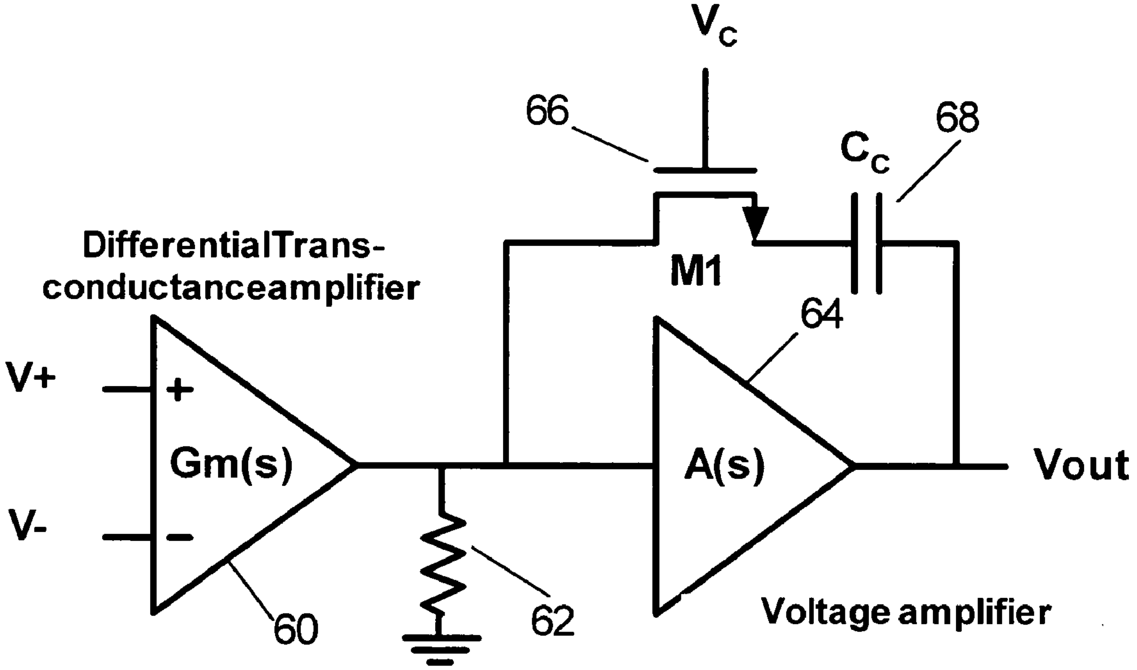
FIG. 5 illustrates another example of a column driver employed at the pixel system.

FIG. 5 illustrates another example of the column driver 10 of FIG. 1. The column driver of FIG. 5 includes a trans-conductance differential amplifier 60 with a gain of Gm, a resistor 62, a voltage gain stage 64 with a gain of A, a compensating MOS transistor 66, and a capacitor 68. The differential amplifier 60 receives two inputs V+ and V−. The voltage amplifier 64 receives the output of the differential amplifier 60. The transistor 66 and the capacitor 68 are connected in series between the output of the differential amplifier 60 and the output Vout of the voltage amplifier 64. The resistor 62 converts the output current of the trans-conductance amplifier 60 to a voltage for the voltage amplifier 64.

The differential amplifier 60 corresponds to the differential amplifier 12 of FIG. 2. The combination of the gain stage 64, the transistor 66 and the capacitor 68 corresponds to the lead compensator 14 of FIG. 2.

The transistor 66 may be a NMOS or PMOS transistor or a transmission gate. The value of $\tau_Z$ is determined, for example, by the capacitance Cc of the capacitor 68 and the resistance of the transistor 66. For fine tuning of the value of $\tau_Z$, the gate of the transistor 66 is connected to a controlling voltage Vc.

Figure 6:
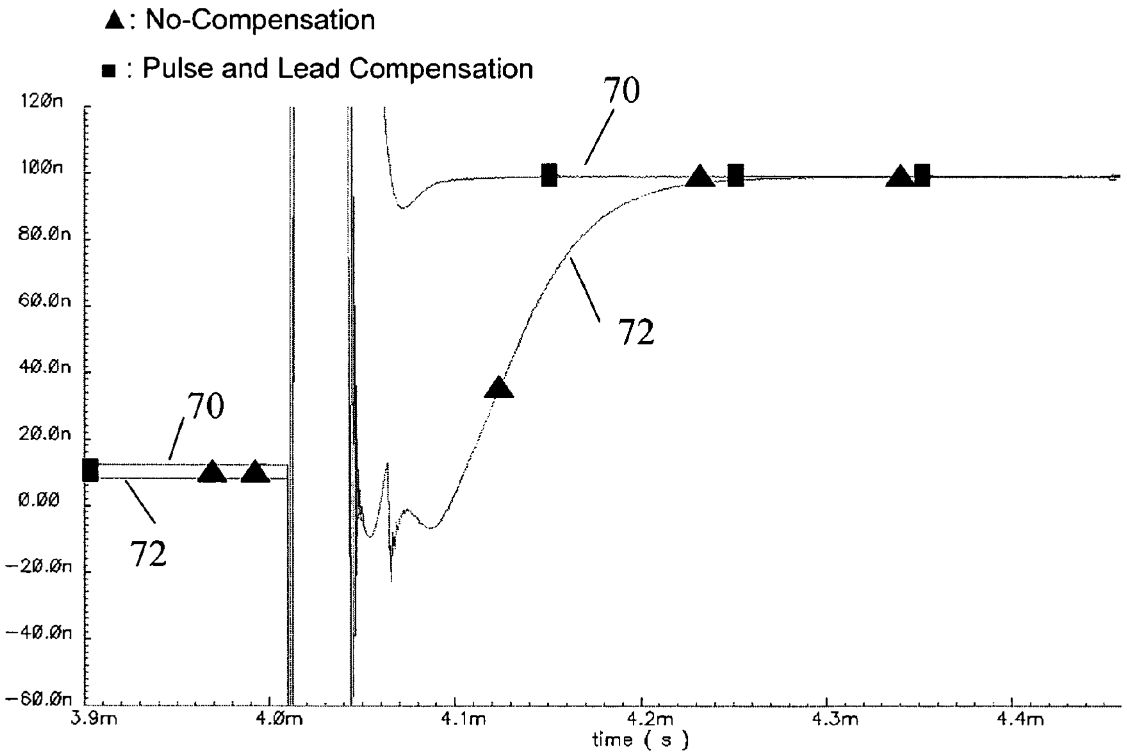
FIG. 6 illustrates simulation results of the lead compensation and an accelerating pulse.

FIG. 6 illustrates simulation results of the feedback driving scheme. In FIG. 6, a waveform 70 is a programming current of an AMOLED pixel circuit with feedback, when driven by the feedback driving scheme having the accelerating pulse (e.g., 50 of FIG. 3) and the lead compensator (e.g., 14 of FIGS. 1 and 2). In FIG. 6, a waveform 72 is a programming current of an AMOLED pixel circuit with feedback, when driven by a simple differential amplifier without the accelerating pulse and the lead compensator. As shown in FIG. 6, the feedback driving scheme having the accelerating pulse and the lead compensator is able to considerably improve the programming speed.

Figure 7:
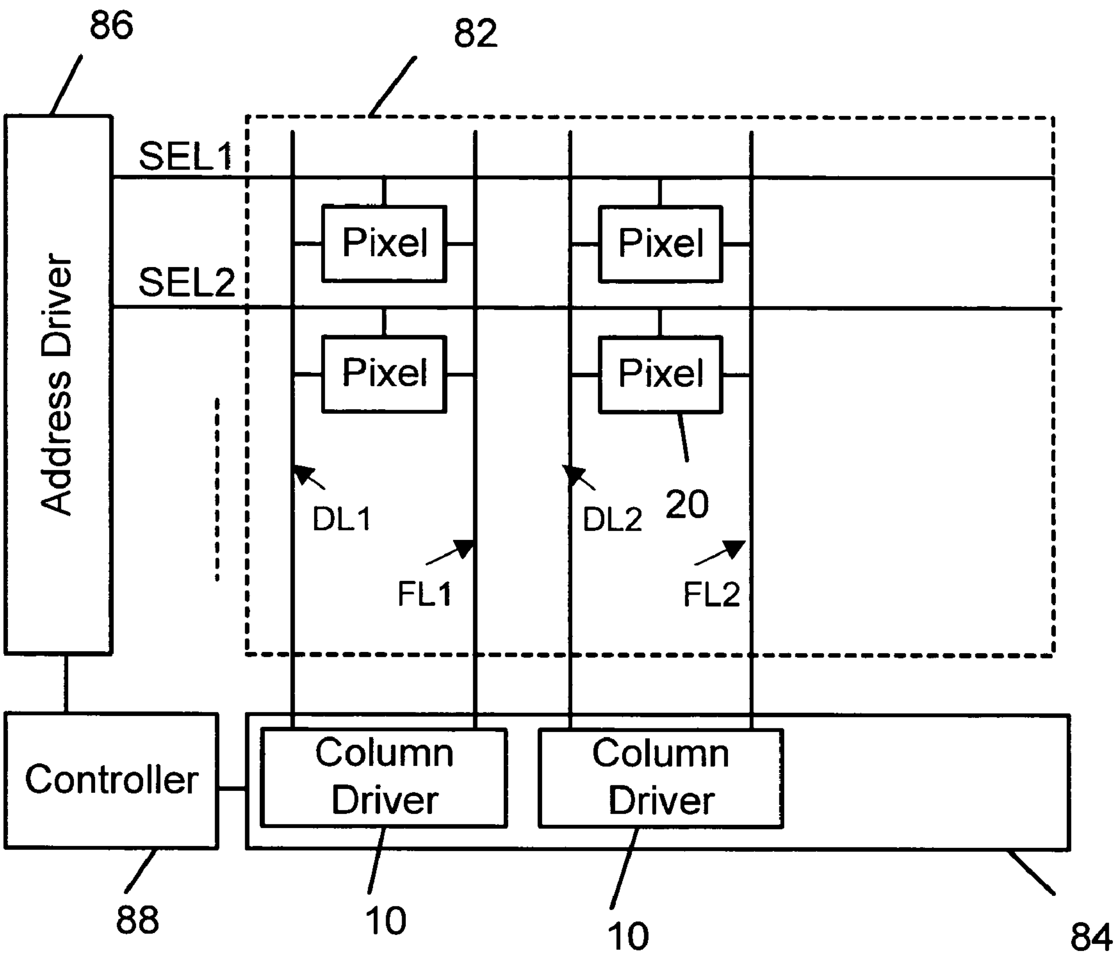
FIG. 7 illustrates an example of a display system which implements the feedback driving scheme.

FIG. 7 illustrates an example of a display system 80 that implements the feedback driving scheme. In FIG. 5, SELi (i=1, 2, . . . ) represents a select line, DLj (j=1, 2, . . . : column number) represents a data line, and FLj represents a feedback line. Each of SEL1, SEL2, . . . corresponds to the signal line 44 of FIG. 1, each of DL1, DL2, . . . corresponds to the data line 40 of FIG. 1, and each of FL1 and FL2, . . . corresponds to the feedback line 42 of FIG. 1. The data line DLj and the feedback line FLj (j=1, 2, . . . ) are shared by all the pixel circuits of the jth column. The display system 80 includes a pixel array 82 in which a plurality of pixel circuits 20 are arranged in row and column. Preferably, the pixel array 82 is an AMOLED display. A data driver 84 and an address driver 86 are provided to the pixel array 82. The data driver 84 includes a plurality of the column drivers 10, each of which is arranged in a column of the pixel array 82. The address driver 86 provides select signals SEL1, SEL2, . . . . The address driver 86 may drive Vc of FIG. 5. The timing of each signal is controlled by a controller 88. The accelerating pulse 50 of FIG. 3 is generated under the control of the controller 88.

In the description above, the pixel circuit 20 with voltage feedback is shown as an example of a pixel circuit to which the feedback driving scheme is applied. However, the feedback driving scheme in accordance with the embodiments of the present invention is applicable to any other pixel circuits with feedback.

The driving scheme of the embodiment of the present invention, including the pulsed shaped data and the lead compensated differential op-amp, accelerates the programming of AMOLED feedback pixel circuits, such as voltage feedback pixel circuits, current feedback pixel circuits, and optical feedback pixel circuits. The combination of the lead compensator and the accelerating pulse improves the programming speed at both high and low OLED currents.

By sending a feedback voltage from each pixel to the column driver during the programming cycle, the driving scheme can compensate for the instability of the pixel elements, e.g., the shift in the threshold voltage of TFTs.

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A system for driving a pixel circuit in an active matrix display, comprising:

a pair of switching transistors for connecting a pixel circuit to a data line and a feedback line during a programming cycle;

a driver for driving the data line during the programming cycle, a select line connected to the gates of said switching transistors for turning on said switching transistors during said programming cycle and turning off said switching transistors at the end of said programming cycle, said driver including:

a feedback mechanism for producing a data signal on the data line based on a difference between a feedback signal on the feedback line from the pixel circuit and a programming signal on a programming signal line, and a controller for enhancing the programming speed of the pixel circuit, the controller providing the programming signal on the programming signal line, the programming signal comprising:

a primary pulse for boosting the charging of a capacitance of the feedback line and a subsequent pulse with programming data to drive the data line based on the data signal during a single programming cycle.

2. A system as claimed in claim 1, wherein the second driver further comprises a module for reducing the settling time of a pixel circuit, the module including a lead compensator coupled between an output of the feedback mechanism and the data line.

3. A system as claimed in claim 2, wherein the feedback mechanism includes a differential amplifier for receiving the programming signal on the programming signal line at a first input and receiving the feedback signal on the feedback line at a second input.

4. A system as claimed in claim 3, wherein the differential amplifier includes an Op-Amp.

5. A system as claimed in claim 3, wherein the differential amplifier includes a trans-conductance differential amplifier.

6. A system as claimed in claim 3, wherein the lead compensator includes a voltage amplifier for amplifying the output of the differential amplifier, and a transistor and a capacitor connected in series between the output of the differential amplifier and the programming signal line.

7. A system as claimed in claim 3, wherein the pixel circuit includes: a first switching transistor connected to the data line, the data line being connected to the output of the lead compensator; and a second switching transistor connected to the feedback line, the feedback line being connected to the second input of the differential amplifier, the first switching transistor and the second switching transistor being selected by a common select signal.

8. A system as claimed in claim 1, wherein the pixel circuit is driven by voltage, current or optical feedback through the second driver.

9. A system as claimed in claim 1, wherein the pixel circuit is a voltage or current programmed pixel circuit.

10. A system as claimed in claim 1, wherein the pixel circuit is arranged in row and column to form the display, the second driver being arranged in each column and being shared by the pixel circuit in the column.

11. A system as claimed in claim 1, wherein the display is an Active-Matrix Organic Light Emitting Diode (AMOLED) display.

12. A method of enhancing the programming speed of a pixel circuit in an active matrix display during a programming cycle, the method comprising:

connecting a pixel circuit to a data line for receiving data and a feedback line for providing a feedback signal from the pixel circuit, said pixel circuit including a pair of switching transistor for connecting the pixel circuit t said data and a feedback lines during a programming cycle;

supplying a select signal to the gates of said switching transistors for turning on said switching transistors during a single programming cycle and turning off said switching transistors at the end of said single programming cycle, and providing a programming signal on said data line while said switching transistors are turned on, the programming signal comprising a primary pulse for boosting the charging of a capacitance of the feedback line, and a subsequent pulse with programming data to drive the data line based on a difference between the feedback signal on the feedback line and the subsequent pulse.

13. A method as claimed in claim 12, wherein the step of connecting comprises:

setting a select signal to connect the pixel circuit to the data line and the feedback line.

14. A method as claimed in claim 12, further comprising the step of: after the programming cycle, resetting the select line to disconnect the pixel circuit from the data line and the feedback line.

15. A method as claimed in claim 12, wherein the pixel circuit is arranged in column and row to form a display, a driver for implementing the step of driving being shared by the pixel circuit in each column.

16. A method as claimed in claim 12, wherein the pixel circuit is driven by voltage, current or optical feedback through a driver for implementing the step of driving.

17. A method as claimed in claim 12, wherein the pixel circuit is a voltage or current programmed pixel circuit.

18. A system as claimed in claim 6, wherein the transistor includes at least one of amorphous, nano/micro crystalline, poly, organic material, n-type material, p-type material, and CMOS silicon.

19. A system as claimed in claim 1, wherein the pixel circuit includes a plurality of transistors including at least one of amorphous, nano/micro crystalline, poly, organic material, n-type material, p-type material, and CMOS silicon.

20. A method as claimed in claim 12, wherein the pixel circuit includes a plurality of transistors including at least one of amorphous, nano/micro crystalline, poly, organic material, n-type material, p-type material, and CMOS silicon.

21. A method as claimed in claim 12, wherein the feedback mechanism comprises a module for reducing the settling time of a pixel circuit, the module includes a lead compensator provided between the output of the feedback mechanism and the data line.

22. A method of driving a pixel circuit in an active matrix display, the pixel circuit including:

a pair of switching transistors for connecting a pixel circuit to a data line and a feedback line during a programming cycle;

a second driver for driving the data line during the programming cycle using a feedback signal on the feedback line and a signal on a programming signal line; and a select line connected to the gates of said switching transistors for turning on said switching transistors during said programming cycle and turning off said switching transistors at the end of said programming cycle, the method comprising:

at a first operation in the programming cycle, said driver connecting the pixel circuit to the data line and the feedback line to provide a data signal on the data line to boost the charging of a capacitance of the feedback line; and at a second operation in the same programming cycle, subsequent to the first operation in the programming cycle, the second driver providing the data signal on the data line based on a difference between a pulse with programming data on the programming signal line and the feedback signal on the feedback line.

23. A method according to claim 22, wherein after the programming cycle, the first driver resetting the select line to disconnect the pixel circuit from the data line and the feedback line.

24. A method according to claim 22, wherein the second driver comprises a feedback mechanism for producing the data signal on the data line based on a difference between the feedback signal on the feedback line from the pixel circuit and the signal on the programming signal line.

25. A method according to claim 24, the feedback mechanism comprising a module for reducing the settling time of a pixel current, the module including a lead compensator provided between an output of the feedback mechanism and the data line.

* * * * *

UNITED STATES PATENT AND TRADEMARK OFFICE

CERTIFICATE OF CORRECTION

PATENT NO. : 8,223,177 B2
APPLICATION NO. : 11/481489
DATED : July 17, 2012
INVENTOR(S) : Arokia Nathan et al.

It is certified that error appears in the above-identified patent and that said Letters Patent is hereby corrected as shown below:

- In Claim 12, Column 7, Line 28:

Cancel “the pixel circuit t” and insert --“the pixel circuit to”--

Signed and Sealed this
Second Day of October, 2012

David J. Kappos
*Director of the United States Patent and Trademark Office*